March 22, 1938. J. A. MURPHY 2,111,936
FLUID PURIFIER
Filed Jan. 14, 1935
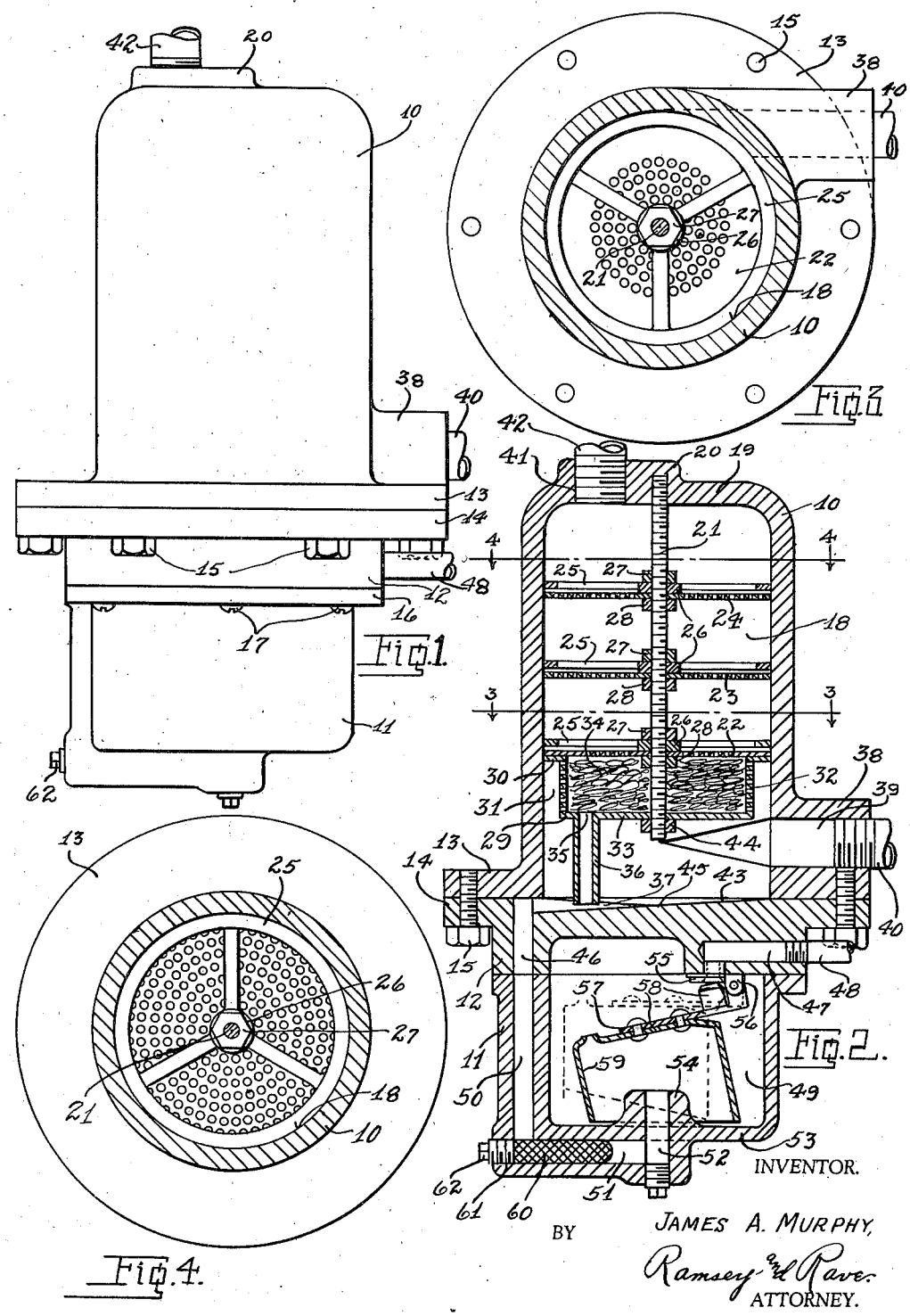
INVENTOR.
JAMES A. MURPHY,
BY Ramsey and Rave
ATTORNEY.

Patented Mar. 22, 1938

2,111,936

UNITED STATES PATENT OFFICE 2,111,936

FLUID PURIFIER

James A. Murphy, Hamilton, Ohio

Application January 14, 1935, Serial No. 1,647

3 Claims. (Cl. 183—66)

This invention relates to improvements in separators or purifiers for air or other gaseous fluids for separating therefrom water, oil and other impurities.

An object of this invention is the provision of an improved separator which will be more efficient in operation.

Another object of the invention is the provision of a purifier for use with gaseous fluids for separating impurities from said fluids and in which the separated impurities are prevented from again mixing or contacting with the gaseous fluid.

A further object of this invention is the provision of a separator or purifier as above referred to in which the separated impurities are held apart from the incoming gaseous fluid and conveyed to a suitable trap whereby the said impurities are prevented from further contact with the said incoming gaseous fluid and therefore prevented from being again picked up by said fluid.

A still further object of the invention is the provision of a separator or purifier that is simple in construction yet very efficient in operation.

Other objects and advantages of the present invention should be readily apparent by reference to the following specification considered in conjunction with the accompanying drawing forming a part thereof and it is to be understood that any modifications may be made in the exact structural details there shown and described, within the scope of the appended claims, without departing from or exceeding the spirit of the invention.

In the drawing:

Fig. 1 is an elevational view of the separator or purifier embodying the improvements of this invention;

Fig. 2 is a vertical sectional view taken in a plane behind the plane of elevation of Fig. 1 and illustrating the internal construction of the device;

Fig. 3 is a horizontal sectional view taken on line 3—3 of Fig. 2; and

Fig. 4 is a view similar to Fig. 3 but taken on a plane above that of Fig. 3 as seen, for example, from line 4—4 on Fig. 2.

Throughout the several views of the drawing similar reference characters are employed to denote the same or similar parts.

Separators or purifiers, particularly for use with compressed air, in the past have made no provision for preventing the further commingling of the separated water, oil or other impurities with the incoming gaseous fluids. It is true that the separated material was not all picked up but a sufficient quantity thereof was again assimilated by the gaseous fluid to prevent said gaseous fluid coming from the separator or purifier from being entirely free of said impurities. By the present invention there has been provided a mechanism by which the separated material is prevented from again contacting the incoming gaseous fluid and thereby insuring a fluid from the separator that is freer of said foreign impurities than is possible from prior art structures.

Specifically, and referring to the drawing, the improved device of this invention comprises an upper housing 10, a lower housing 11 and an intermediate plate 12. The upper housing 10 is provided at one end with a flange 13 lying on a flange 14 integral with the intermediate plate 12. A suitable gasket (not shown) is disposed between these flanges and secured therein by bolts 15 which extend through one flange and are threaded into the other flange. The other end of the intermediate plate 12 contacts a flange 16 formed on the lower housing 11 and there is disposed therebetween a gasket (not shown) to render said joint air and water tight. The said flange 16 and therefore the housing 11 is secured to the intermediate plate 12 by suitable machine screws or the like 17.

The upper housing 10, see Fig. 2, is hollow and in effect constitutes a separator chamber 18 which is closed at the upper end by a wall 19. Threaded into the upper wall 19 and in a boss 20 thereon is one end of a screw-threaded rod 21 depending centrally of the separator chamber 18. The rod 21 has spacedly secured thereto a plurality of perforated baffles 22, 23 and 24 having the perforations therein graduated as to size or diameter by decreasing in size, from the lower end of the chamber to the upper end thereof. Disposed above each of the baffles is a spider 25 each having at the center thereof a hub 26 which is of greater thickness than the spider itself and which hub contacts with its baffle at the center thereof around the rod 21.

This hub 26 spaces the spider as a whole from its baffle for a purpose later on to be made clear. Each spider and its baffle plate is secured to the rod between a pair of opposite nuts 27 and 28 threaded on the rod.

The lowermost baffle plate 22 is provided with perforations only for a short distance from its center or the axis of the rod 21 as seen most clearly in Fig. 3, while the other baffle plates 23 and 24 are perforated substantially throughout their area. Underlying the baffle plate 22 is a receptacle 29 having at its upper end a peripheral flange 30 which contacts with the undersurface of the baffle plate 22 around its periphery and in effect provides a passageway 31 between the inner surface of the housing 10 and outer surface of the receptacle 29. The vertical wall 32 of the receptacle between its bottom 33 and peripheral flange 30 is provided with perforations whereby communication is had between the chamber 18 and interior of the receptacle 29. Disposed within said interior of the receptacle 29 is a quantity of copper threads or wires of very small diameter and known as a copper tangle and indicated in the drawing by the reference numeral 34. The reason for making this tangle of copper is to prevent same from rusting or deteriorating by action of the water thereon which is separated from the gaseous fluid as it passes through the device. The bottom 33 of the receptacle 29 is provided with a perforation 35 communicating with a spout or short section of pipe 36 depending from the base of the receptacle. The lower end of the said spout 36 terminates just short of the upper surface of the intermediate plate 12 or in a duct or passage 37 formed in said upper surface. The receptacle 29 is secured in position on the rod 21 by a nut 44 threaded on said rod and engaging the undersurface of the bottom 33 thereof.

The housing 10 is provided just above its flange 13 with a boss 38 having formed therethrough a bore 39 for one end of a pipe 40 which is the intake pipe for the gaseous fluid from which the impurities are to be separated. As will be seen from Fig. 3, the housing 10 and chamber 18 are substantially cylindrical and the inlet 39 is formed tangential thereto thereby causing the incoming gaseous fluid to be swirled within the chamber 18 before passing upwardly therethrough. The upper wall 19 of the chamber and its boss 20 is provided with a threaded perforation 41 for the discharge pipe 42 through which the purified gaseous fluid passes to the point of use such as a tool, sand blast machine or the like. The swirling of the gaseous fluid in the chamber below the lowermost baffle plate 22 and receptacle 29 causes a large quantity of the water, oil and other impurities therein to be discharged by centrifugal force which is collected on the inner wall of the chamber 18 and outer surface of the spout 36 and trickles downwardly onto the upper surface 43 of the intermediate plate 12. The gaseous fluid then passes through the perforated vertical wall of the container 29 into and through the copper tangle 34 of the container. The fluid then passes upwardly through the perforations in the baffle plates 22, 23 and 24 to the pipe or conduit 42. The gaseous fluid is forced to travel through a quantity of the copper tangle 34 because only the central portion of the baffle plate 22 is provided with the perforations as pointed out above and as illustrated in Fig. 3. The force or pressure behind the gaseous fluid in being forced through the baffle plates flexes said plates to the extent permitted by the spiders 25 and due to their surface contact with the said gaseous fluid, collect moisture, oil and the like from the fluid. When the pressure is shut off as frequently happens with air-operated equipment the inherent spring in said baffle plates causes same to assume their normal position and thereby discharge the moisture and the like collected thereon. The major portion of the moisture and the like left in the gaseous fluid after the swirling thereof is removed by the copper tangle and flows downwardly to the base of the container 33 and is discharged through the spout 36 to the duct 37 or a point just above the top surface 43 of the plate 12. This moisture or the like is therefore completely enclosed and shut off from the incoming gaseous fluid and can, therefore, not be picked up by said fluid.

The intermediate plate 12 as above noted is provided with an upper surface 43 which in effect constitutes the base for the separator chamber 18. This upper surface is dished so as to drain to the center 45 thereof from which point the duct or passage 37 extends. This duct or passage 37 terminates or empties into a passage 46 formed vertically through the said intermediate plate. The intermediate plate is provided at a point remote from the passage 46 with a discharge passage 47 to which is connected a discharge pipe 48.

The lower housing 11 is in effect a trap housing and has its interior hollow as at 49 and constituting the trap chamber. The housing 11 is provided with a vertical passage 50 which communicates at one end with the passage 46 and at its other end with a horizontal passage 51. The port 51 in turn empties into a second vertical passage 52 formed through the bottom 53 of the housing 11 and through a boss or lug 54 upstanding from the said housing bottom 53 and interiorly of the chamber.

The intermediate plate 12 is provided with an aperture in which is mounted a valve seat 55 having a valve controlled aperture therethrough and through which aperture communication is had between the chamber 49 and passage 47. The valve seat 55 has integral therewith a lug 56 to which is pivotally mounted an arm 57. The arm 57 carries a valve 58 for closing the aperture in the valve seat 55 and the arm 57 has further secured thereto an inverted bucket 59 which is utilized for actuating the arm 57 about its pivot.

The operation of the discharge trap is readily understood by those conversant with this art and is briefly as follows. The moisture, oil and the like, separated from the gaseous fluid while passing through the separator chamber 18, is directed to the duct 37, passage 46, 50, 51 and 52 to the chamber 49 where it is collected. Simultaneously with the downward flow of the above-mentioned moisture and the like is the gaseous fluid which acts on the undersurface of the bucket bottom for raising same to the dotted-line position shown in Fig. 2 and holding said bucket in said position. The water, moisture and the like continues to build up in the chamber 49 until it reaches a point that the said bucket is completely submerged whereupon the bucket by its own weight drops to the solid line position and removes the valve 58 from its seat. The pressure now acts on the collected moisture, water and the like for forcing same through the aperture in the valve seat 55 into the passage 47 and discharge pipe 48 where it is directed to a suitable receptacle, sewer or the like. As soon as sufficient moisture and the like has been discharged from the chamber 49 the bucket 59 is again returned to the dotted-line position.

In order to prevent large pieces of foreign material and sediment from entering the discharge chamber 49 and interfering with the valve 58 being properly seated there is provided in the passage 51 a suitable screen 60. This screen is inserted in the passage and may be removed therefrom for cleaning purposes and the like through a suitable aperture 61 at the outer end of said passage. This aperture is threaded and normally carries a pipe plug or the like 62 for closing the outer end of the passage.

From the foregoing it will now be evident that there has been provided a separator or purifier for gaseous fluids which is relatively simple in construction and which will prevent the incoming gaseous fluid from picking up moisture, water and the like separated from the gaseous fluid previously passed therethrough.

What is claimed is:

1. In a combined separator and trap mechanism the combination of a pair of superimposed housings respectively forming a separator chamber and a trap chamber, an intermediate plate between said housings and on opposite sides thereof completing said separator chamber and trap chamber, means within the separator chamber for removing moisture and the like from the gaseous fluid as it passes therethrough, a substantially closed receptacle within the separator chamber through which the gaseous fluid passes for receiving the moisture, means for conveying the moisture from the receptacle to the trap chamber, and filter means within the receptacle for removing moisture from the gaseous fluid.

2. In a combined separator and trap mechanism the combination of a pair of superimposed housings respectively forming a separator chamber and a trap chamber, an intermediate plate between said housings and on opposite sides thereof completing said separator chamber and trap chamber, means within the separator chamber for removing moisture and the like from the gaseous fluid as it passes therethrough, a substantially closed receptacle within the separator chamber through which the gaseous fluid passes for receiving the moisture, means for conveying the moisture from the receptacle to the trap chamber, filter means within the receptacle for removing moisture from the gaseous fluid, and automatically operable means within the trap chamber for automatically, periodically discharging the moisture therefrom.

3. In a device of the class described the combination of a housing having therein a separating chamber through which a gaseous fluid passes, a baffle within said chamber for removing moisture and the like from the gaseous fluid, said chamber having a space below the baffle into which the gaseous fluid is injected before passing through the baffle, a receptacle adjacent the baffle through which the gaseous fluid passes for collecting the moisture and the like separated from the fluid by the baffle, closed means for conveying said moisture and the like from the receptacle through the space initially entered by the gaseous fluid and thereby preventing the incoming gaseous fluid from picking up the moisture and the like previously separated from the fluid, a trap associated with the housing and chamber below the separating chamber to which the separated liquid is conveyed from the receptacle, and means within the trap chamber for automatically discharging the liquid and the like therefrom.

JAMES A. MURPHY.